US011859719B2

(12) United States Patent
Petersson

(10) Patent No.: US 11,859,719 B2
(45) Date of Patent: Jan. 2, 2024

(54) PARKING LOCK DEVICE

(71) Applicant: Ningbo Geely Automobile Research & Development Co., Ltd., Ningbo (CN)

(72) Inventor: Peter Petersson, Nödinge (SE)

(73) Assignee: Ningbo Geely Automobile Research & Development Co., Ltd., Ningbo (CN)

( * ) Notice: Subject to any disclaimer, the term of this patent is extended or adjusted under 35 U.S.C. 154(b) by 200 days.

(21) Appl. No.: 17/467,331

(22) Filed: Sep. 6, 2021

(65) Prior Publication Data

US 2021/0396312 A1 Dec. 23, 2021

Related U.S. Application Data

(63) Continuation of application No. PCT/CN2020/078835, filed on Mar. 11, 2020.

(30) Foreign Application Priority Data

Mar. 14, 2019 (EP) ..................................... 19163011

(51) Int. Cl.
*F16H 63/34* (2006.01)
*B60T 1/00* (2006.01)

(52) U.S. Cl.
CPC .......... *F16H 63/3425* (2013.01); *B60T 1/005* (2013.01); *F16H 63/3483* (2013.01)

(58) Field of Classification Search
CPC ... F16H 63/3425; F16H 63/3483; B60T 1/005
See application file for complete search history.

(56) References Cited

U.S. PATENT DOCUMENTS

| 4,157,745 A | 6/1979 | Nelson |
| 6,125,983 A | 10/2000 | Reed |
| 6,279,713 B1 * | 8/2001 | Young ..................... F16H 61/22 |
| | | 192/219.5 |

FOREIGN PATENT DOCUMENTS

| CN | 107606146 A | 1/2018 | |
| DE | 102013008604 A1 | 9/2014 | |
| DE | 102013106303 A1 | 12/2014 | |
| DE | 102017202443 A1 | 8/2018 | |
| DE | 102018201432 A1 * | 8/2019 | ......... F16H 63/3466 |
| JP | 2003237550 A | 8/2003 | |
| WO | 2018095478 A1 | 5/2018 | |
| WO | WO-2018145696 A1 * | 8/2018 | ......... F16H 63/3425 |

OTHER PUBLICATIONS

International Search Report from corresponding International Application No. PCT/CN2020/078835, dated Jun. 10, 2020, 2 pages.

* cited by examiner

*Primary Examiner* — Lori Wu
(74) *Attorney, Agent, or Firm* — Tucker Ellis LLP

(57) ABSTRACT

A parking lock device for a transmission of a vehicle. The device comprising a wheel, a pawl for locking the wheel against rotation and an actuator unit arranged for movement of the pawl relative to the wheel. The pawl has a locked position where the pawl and the wheel are engaged and an unlocked position where the pawl and the wheel are disengaged. The pawl and the actuator unit are mechanically coupled to each other by a pin and slot mechanism having a guide slot and a guide pin received by the guide slot.

12 Claims, 6 Drawing Sheets

PARKING LOCK DEVICE

RELATED APPLICATION DATA

This application is a continuation of International Patent Application No. PCT/CN2020/078835, filed Mar. 11, 2020, which claims the benefit of European Patent Application No. 19163011.0, filed Mar. 14, 2019, the disclosures of which are incorporated herein by reference in their entireties.

TECHNICAL FIELD

The invention relates to a parking lock device for a transmission of a vehicle, which device comprises a wheel, a pawl for locking the wheel against rotation and an actuator unit arranged for movement of the pawl relative to the wheel. The invention also relates to a transmission comprising such a parking lock device.

BACKGROUND

Vehicle transmissions usually have parking lock mechanisms with an actuation linkage system for engagement of a ratchet wheel and a pawl, for locking a shaft of the transmission.

Such a parking lock mechanism requires several components made with small tolerances, such as actuating rods, cone and cone interface, and springs. Due to the tolerance chain for the critical components, high demands are placed on the production. Further, the assembling process is also relatively complicated and since the packing space in the transmission is often very limited, it is desirable that the number of components be kept down.

SUMMARY

An objective of the invention is to provide a parking lock device for a transmission of a vehicle, which device is less complicated and enables a simplified production and assembling of the parking lock mechanism.

The objective is achieved by a parking lock device for a transmission of a vehicle, wherein the device comprises a wheel, a pawl for locking the wheel against rotation and an actuator unit arranged for movement of the pawl relative to the wheel, and the pawl has a locked position where the pawl and the wheel are engaged and an unlocked position where the pawl and the wheel are disengaged, and wherein the pawl and the actuator unit are mechanically coupled to each other by a pin and slot mechanism having a guide slot and a guide pin received by the guide slot.

The invention is based on the insight that by such a parking lock device, a number of components can be omitted at the same time as a robust design for the parking lock function can be achieved.

Although the guide pin is suitably attached to the actuator unit and the guide slot is arranged in the pawl, it would also be possible to attach the pin to the pawl and arrange the guide slot in the actuator unit.

According to one embodiment of the parking lock device, the actuator unit is arranged to move the pawl from the unlocked position to the locked position by movement of the guide pin along the guide slot in a first direction, and from the locked position to the unlocked position by movement of the guide pin along the guide slot in a second direction. Hereby, both engagement and disengagement of the parking lock device can be performed with one and the same actuator unit. For example, the second direction can be opposite to the first direction.

According to a further embodiment, the actuator unit comprises a pushrod for linear movement which pushrod is mechanically coupled to the pawl by the pin and slot mechanism. Hereby, the pawl can be moved by a non-complicated motion of the pushrod. The actuator unit preferably comprises a hydraulic cylinder for movement of the pushrod. Hydraulic fluid can then be provided by a hydraulic system already used for other functions of a transmission.

For at least a part of the guide slot, the main extension direction of the guide slot is preferably angled relative to the linear movement direction of the pushrod. The main extension direction of said guide slot part has suitably an extension direction component perpendicular to the linear movement direction of the pushrod in a direction away from the wheel when the guide pin moves in the first direction. Hereby, the pawl can be moved by the guide pin being pushed against a surface defining the guide slot.

According to a further embodiment, the actuator unit has a support portion arranged to guide the pushrod for counteracting deviation from the linear movement of the pushrod. Hereby, a robust design for movement of the pawl can be achieved.

According to a further embodiment, the actuator unit comprises a spring arranged to counteract movement of the pawl from the locked position towards the unlocked position. Hereby, the locked position of the pawl can be reached even if initially there is a mismatch between a tooth of the pawl and teeth of the wheel, and when the locked position is reached the engagement of the pawl and the wheel can be secured by the spring.

The spring is preferably arranged on the pushrod for counteracting movement of the pawl from the locked position towards the unlocked position. Hereby, a compact and robust design can be achieved.

According to a further embodiment, the pawl is pivotally arranged for pivoting about a pivot axis between the locked position and the unlocked position, and preferably, in the unlocked position of the pawl, the wheel is pivotable about a pivot axis which is substantially in parallel with the pivot axis of the pawl. Hereby, a robust and compact design for movement of the pawl relative to the wheel can be achieved.

The main extension direction of the guide slot is suitably perpendicular to the pivot axis of the pawl.

According to a further embodiment, the pawl has a body with a first end pivotally arranged for pivoting about the pivot axis and a second end mechanically coupled to the actuator unit by the pin and slot mechanism, wherein the body is provided with a tooth for engagement with the wheel which tooth is arranged between the first end and the second end of the pawl body. Hereby, a robust and non-complicated design for locking the wheel can be achieved.

According to a further aspect of the invention, a further objective is to provide a transmission comprising a parking lock device.

The advantages of the transmission are substantially the same as the advantages already discussed hereinabove with reference to the different embodiments of the parking lock device.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
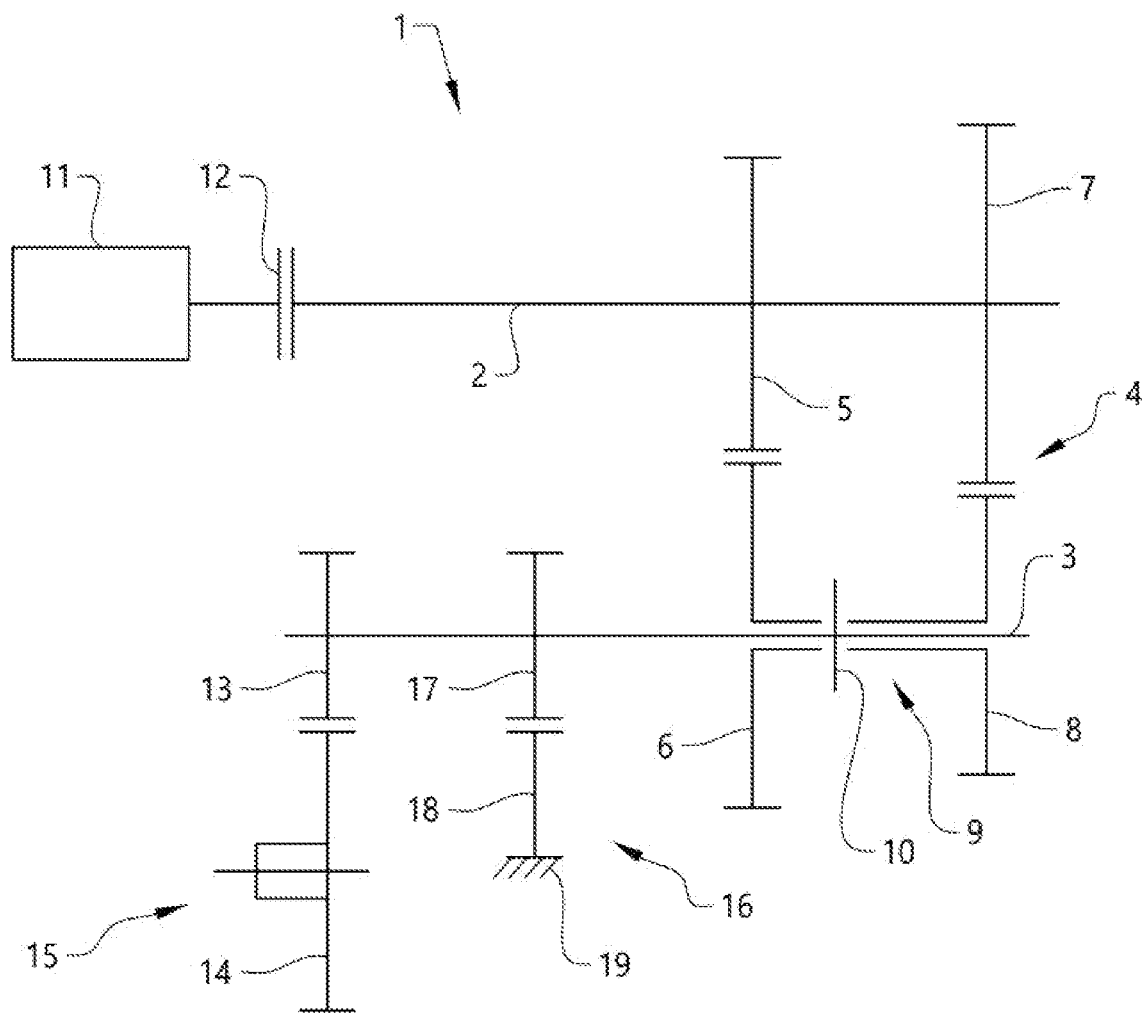
FIG. 1 is a schematic view showing an example embodiment of a transmission for a vehicle.

FIG. 1 is a schematic view showing a transmission 1 for a vehicle.

The transmission has an input shaft 2 and an output shaft 3. The input shaft 2 and the output shaft 3 are connected to each other by gear wheels 4. For example, a first gear wheel 5 of the input shaft 2 is engaged with a first gear wheel 6 of the output shaft 3, and a second gear wheel 7 of the input shaft 2 is engaged with a second gear wheel 8 of the output shaft 3. The gear wheels 6, 8 of the output shaft 3 can be idle wheels, i.e. these gear wheels 6, 8 are journaled on the output shaft 3 but can be rotationally locked to the output shaft by a synchronizer 9. By movement of a synchronizer sleeve 10 in a first direction, the first gear wheel 6 of the output shaft 3 is rotationally locked to the output shaft 3. By movement of the synchronizer sleeve 10 in a second opposite direction, the second gear wheel 8 of the output shaft 3 is rotationally locked to the output shaft 3. Thus, one gear is represented by the first gear wheel 5 of the input shaft 2 and the first gear wheel 6 of the output shaft 3. A further gear is represented by the second gear wheel 7 of the input shaft 2 and the second gear wheel 8 the output shaft 3.

The input shaft 2 can be driven by a motor 11. The motor 11 can be any suitable motor, such an internal combustion engine, electric motor, etc. Between the motor 11 and the transmission 1, a clutch 12 is suitably arranged for enabling the transmission 1 to be connected or disconnected to/from the motor 11.

In the example embodiment illustrated in FIG. 1, the output shaft 3 has an output gear wheel 13. The output gear wheel 13 is rotationally locked to the output shaft 3 and is engaged with a ring gear wheel 14 of a differential device 15, thereby connecting the output shaft 3 to the ring gear wheel 14. The differential device 15 is in turn suitably conventionally connected to the driven wheels of a vehicle (not shown).

As schematically indicated in FIG. 1, the transmission 1 comprises a parking lock device 16. The parking lock device 16 has a wheel 17, such as a gear wheel or ratchet wheel rotationally locked to a shaft 3 of the transmission 1. In the example embodiment illustrated in FIG. 1, the wheel 17 is arranged on the output shaft 3. The transmission 1 further comprises a pawl 18 and an actuator unit (not shown in FIG. 1) arranged for movement of the pawl 18 relative to the wheel 17.

The pawl 18 has a locked position where the pawl 18 and the wheel 17 are engaged and an unlocked position where the pawl 18 and the wheel 17 are disengaged from each other. When the pawl 18 and the wheel 17 are engaged with each other, the output shaft 3 is locked to a housing 19 of the transmission 1.

Figure 2A:
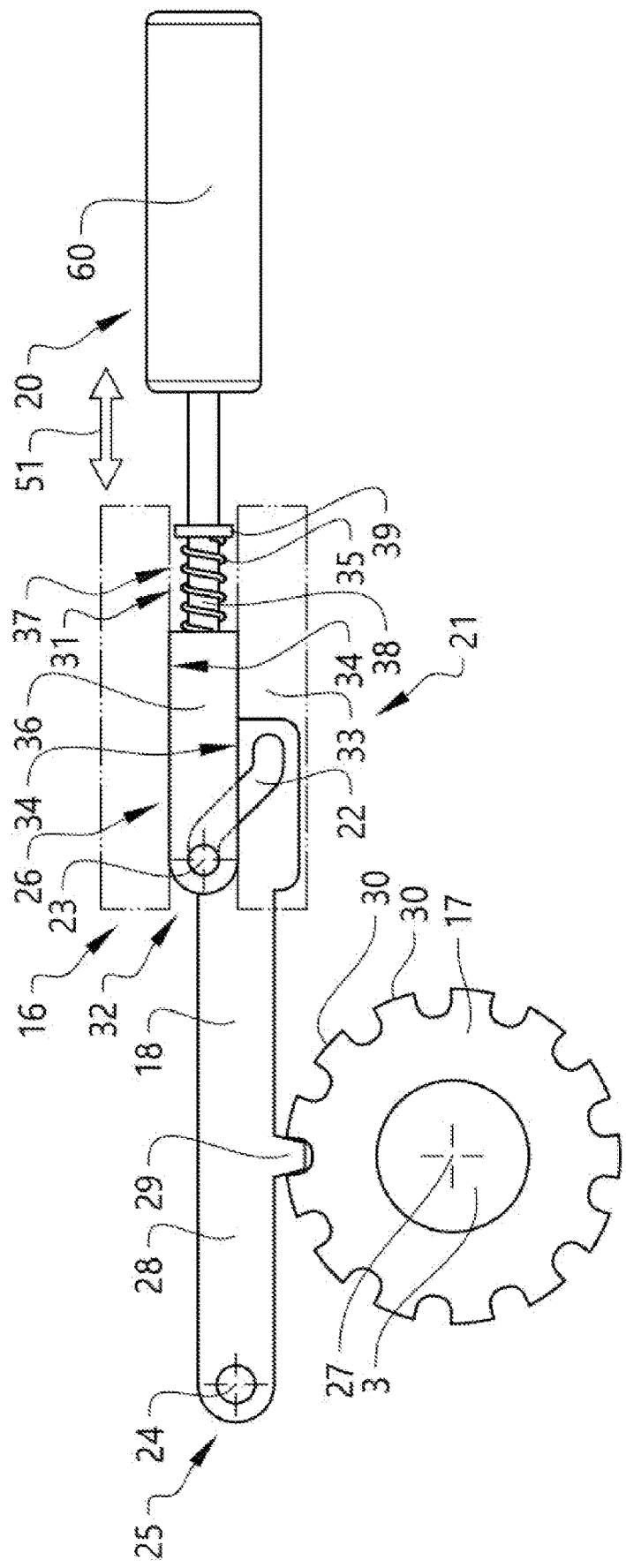
FIG. 2A is a side view showing a parking lock device when a pawl and a wheel are engaged.
Figure 2B:
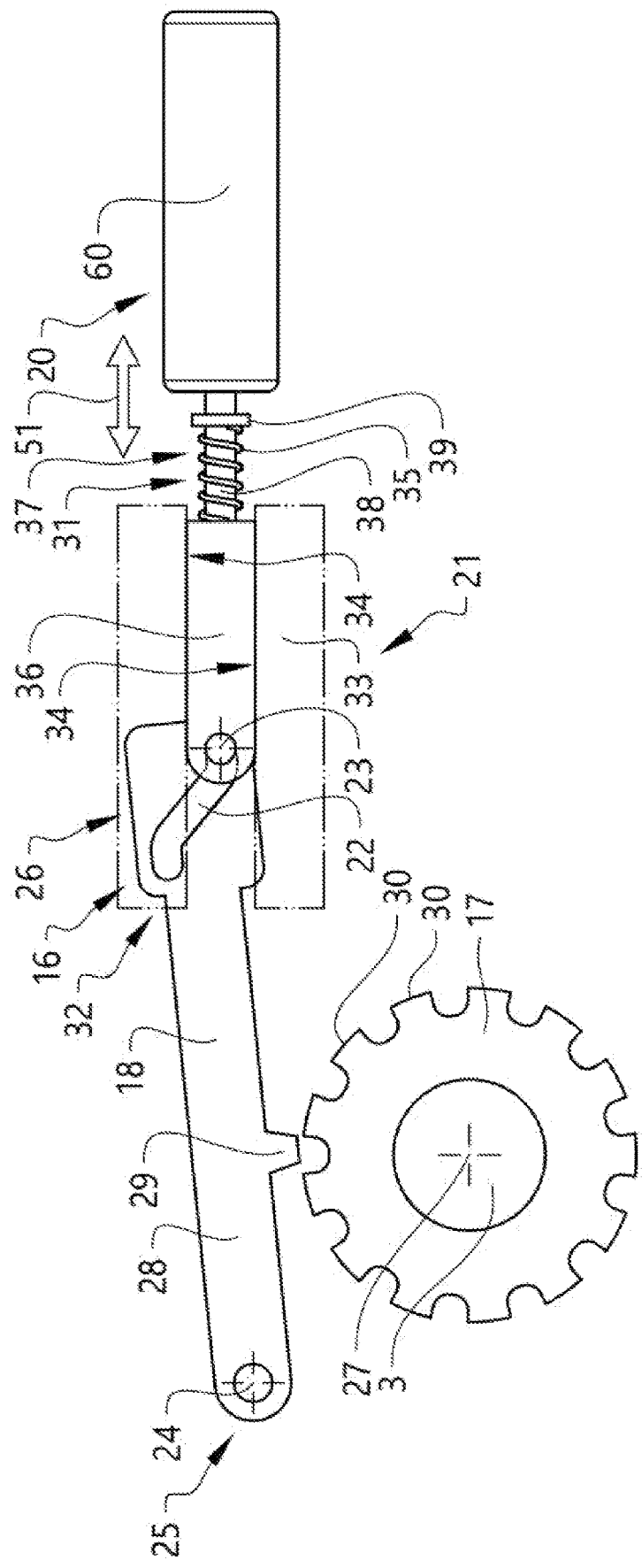
FIG. 2B is a side view of the parking lock device in FIG. 2A when the pawl and the wheel are disengaged.

FIGS. 2A and 2B show a side view of the parking lock device 16 more in detail.

In FIG. 2A the parking lock device locks the shaft 3 against rotation. The parking lock device 16 comprises the wheel 17, the pawl 18 and the actuator unit 20 arranged for movement of the pawl 18 relative to the wheel 17. In FIG. 2A the pawl 18 is in a locked position where the pawl 18 and the wheel 17 are engaged, thereby locking the shaft 3 against rotation.

The pawl 18 and the actuator unit 20 are mechanically coupled to each other by a pin and slot mechanism 21 having a guide slot 22 and a guide pin 23 received by the guide slot 22. In the example embodiment illustrated in FIG. 2A, the guide pin 23 is attached to the actuator unit 20 and the guide slot 22 is arranged in the pawl 18, though in another embodiment the guide pin could be attached to the pawl and the guide slot could be arranged in the actuator unit.

The pawl 18 is suitably pivotally arranged for pivoting about a pivot axis 24 from the locked position to the unlocked position, and from the unlocked position to the locked position. In the example embodiment illustrated in FIGS. 2A and 2B, the pawl has a body 28 with a first end 25 pivotally arranged for pivoting about the pivot axis 24 and a second end 26 mechanically coupled to the actuator unit 20 by the pin and slot mechanism 21.

The first end 25 of the pawl 18 is pivotally connected to a fixed point, such as the housing 19 of the transmission 1. The guide slot 22 is arranged at the second end 26 of the pawl 18, opposite to the first end 25 of the pawl 18.

The body 28 is provided with a tooth 29 for engagement with the wheel 17 which tooth 29 is arranged between the first end 25 and the second end 26 of the pawl body 28. The wheel 17 has suitably corresponding teeth 30 for receiving the tooth 29 between two teeth 30.

The wheel 17 (and the shaft 3) is pivotable about a pivot axis 27 when the pawl 18 and the wheel 17 are disengaged. This wheel pivot axis 27 can be substantially in parallel with the pawl pivot axis 24.

The actuator unit 20 is arranged to move the pawl 18 from the unlocked position to the locked position by movement of the guide pin 23 along the guide slot 22 in a first direction, and from the locked position to the unlocked position by movement of the guide pin 23 along the guide slot 22 in a second direction. In FIGS. 2A and 2B, the first direction is from right to left, and the second direction is from left to right.

In FIG. 2A the guide pin 23 is positioned in a leftmost position corresponding to the locked position of the pawl 18 where the pawl 18 and the wheel 17 are engaged. In FIG. 2B the guide pin 23 is positioned furthest to the right in a position corresponding to the unlocked position of the pawl 18 where the pawl 18 and the wheel 17 are disengaged.

The actuator unit 20 comprises a pushrod 31 for linear movement which pushrod 31 is mechanically coupled to the pawl 18 by the pin and slot mechanism 21. At a free end 32 of the pushrod 31, the guide pin 23 is attached to the pushrod 31. For example, the actuator unit 20 may comprise a hydraulic cylinder 60 for movement of the pushrod 31. In other words; the pushrod 31 is connected to a piston of the hydraulic cylinder 60. In FIG. 2A the pushrod 31 has been moved by the hydraulic cylinder 60 to an extended position, whereas in FIG. 2B the pushrod has been moved to a retracted position by the hydraulic cylinder 60. Optionally, the hydraulic cylinder can be replaced by an electric motor and a ball screw, or a pneumatic cylinder, or by any another suitable drive unit.

The actuator unit 20 can have a support portion 33 arranged to support and guide the pushrod 31 for counteracting deviation from the linear movement of the pushrod 31. Such a support portion 33 may have one or more guiding surfaces 34 for guiding the pushrod 31 in the linear direction.

In the example embodiment illustrated in FIGS. 2A and 2B, the actuator unit 20 comprises a spring 35 arranged to counteract movement of the pawl 18 from the locked position towards the unlocked position. The spring 35 can be a coil spring or any other suitable spring. The spring 35 will enable engagement of the pawl 18 and the wheel 17 even if initially there is a mismatch between the tooth 29 of the pawl 18 and the teeth 30 of the wheel 17. As soon as the relative position between the pawl 18 and the wheel 17 is achieved the spring 35 will ensure engagement of the pawl 18 and the wheel 17.

The spring 35 can be arranged on the pushrod 31. In the example embodiment illustrated in FIGS. 2A and 2B, the pushrod 31 has a first outer portion 36 to which the guide pin 23 is attached. The outer portion 36 is arranged to interact with the guiding surfaces 34 as described hereinabove. Further, the pushrod 31 has an inner portion 37 with a rod 38 receiving the spring 35. The outer portion 36 and the inner portion 37 are axially displaceable relative to each other in the movement direction 51 of the pushrod 31. The spring 35 is arranged between the outer portion 36 and a support part or spring seat 39 of the inner portion 37 of the pushrod 31, for counteracting relative movement of the inner portion 37 and the outer portion 36.

This means that when the pushrod is being extended (moved from right to left in FIGS. 2A and 2B) the force will be transferred from the inner portion 37 to the outer portion 36 by means of the spring 35. When the pushrod is being retracted (moved from left to right in FIGS. 2A and 2B), the spring will be unloaded, and the force will be directly transferred from the inner portion 37 to the outer portion 36.

Figure 3A:
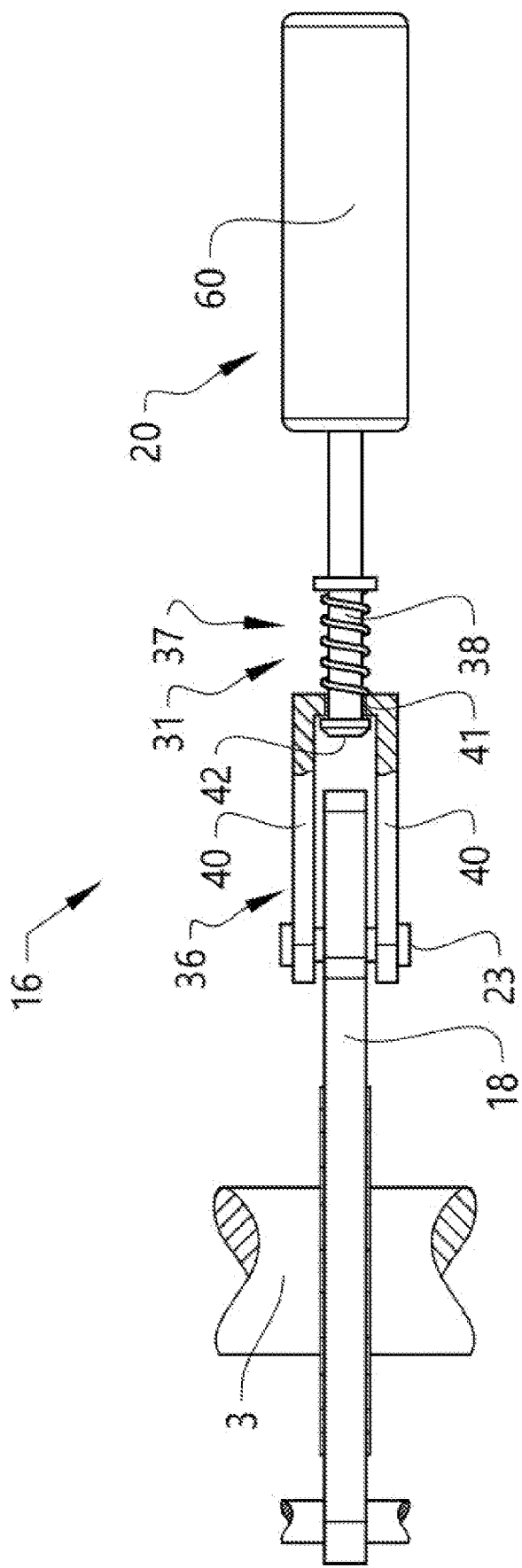
FIG. 3A is a top view of the parking lock device in FIG. 2A.
Figure 3B:
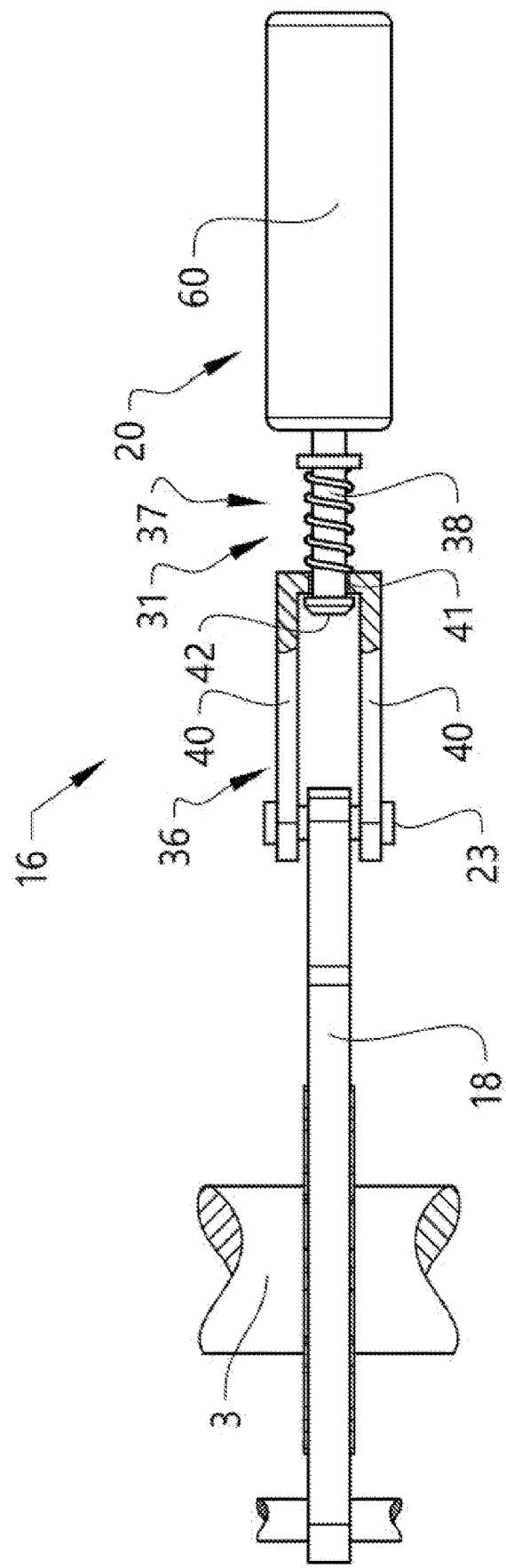
FIG. 3B is a top view of the parking lock device in FIG. 2B.

FIGS. 3A and 3B show the parking lock device 16 in FIGS. 2A and 2B in top views. FIG. 3A corresponds to FIG. 2A with respect to the guide pin position, and FIG. 3B corresponds to FIG. 2B with respect to the guide pin position.

The outer portion 36 of the pushrod 31 has two legs 40 forming a fork and the pawl 18 is received between the legs 40. The guide pin 23 is attached to the legs 40 and received by the guide slot 22 of the pawl 18. The outer portion 36 has a through hole 41 for receiving the rod 38 of the inner portion 37. At the end of the rod 38 a carrier or pusher unit 42 is arranged to transfer the force from the inner portion 37 to the outer portion 36 when the pushrod 31 is being retracted.

Figure 4:
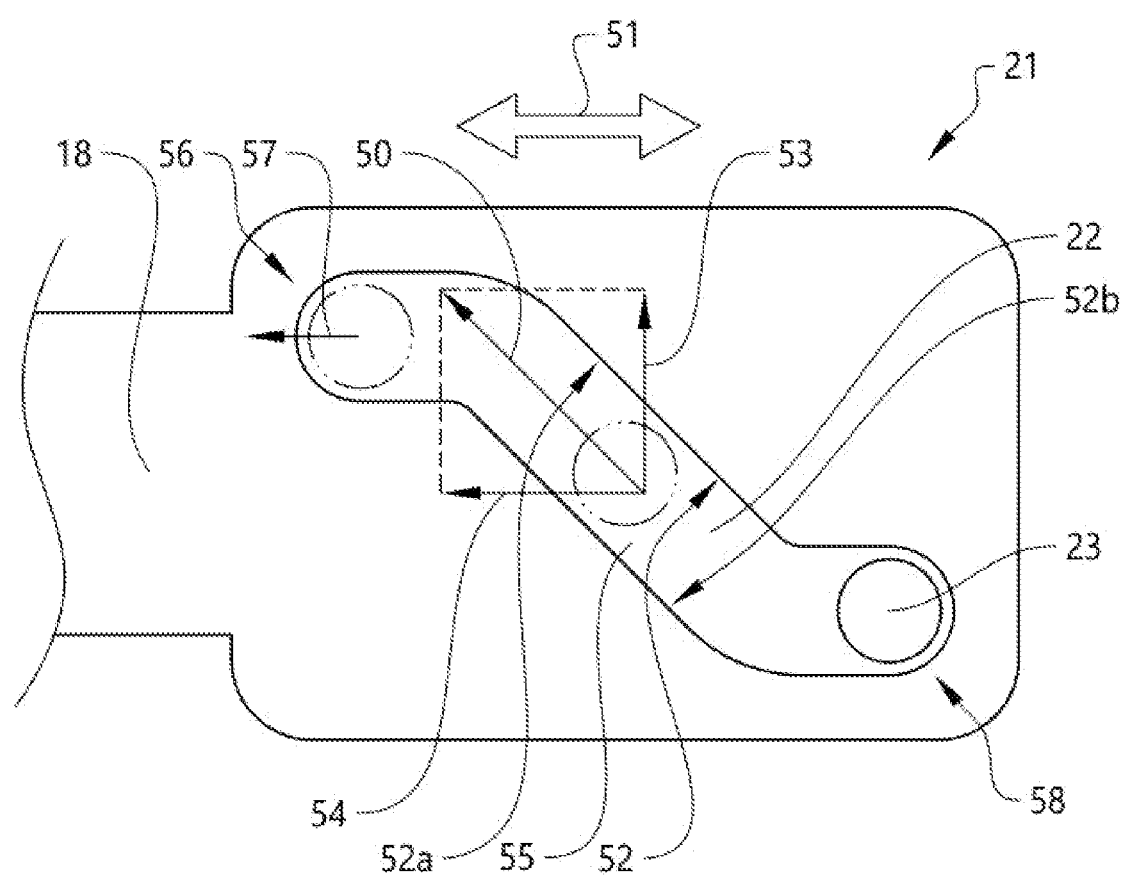
FIG. 4 is an enlarged view of a guide slot of a pin and slot mechanism.

FIG. 4 shows an example embodiment of a guide slot 22 of the pin and slot mechanism 21.

For at least a part 55 of the guide slot 22, the main extension direction 50 of the guide slot 22 is angled relative to the linear movement direction 51 of the pushrod 31, thereby causing the guide pin 23 to push against a surface 52 defining the guide slot 22, when the pushrod 31 is moved.

When the pushrod 31 is being retracted the guide pin 23 will push the pawl 18 away from the wheel 17. The guide pin 23 will push against an upper portion 52*a* of the guide slot defining surface 52. In the example embodiment illustrated in FIGS. 2A and 2B, this means the pawl 18 is pivoted anti-clockwise about the pawl pivot axis 24. When the pushrod 31 is being extended the guide pin 23 will push the pawl 18 towards the wheel 17. The guide pin 23 will push against a lower portion 52*b* of the guide slot defining surface 52. In the example embodiment illustrated in FIGS. 2A and 2B, this means the pawl 18 is pivoted clockwise about the pawl pivot axis 24.

In other words; the main extension direction 50 of said guide slot part 55 has an extension direction component 53 perpendicular to the linear movement direction 51 of the pushrod 31 in a direction away from the wheel 17 when the guide pin 23 moves in the first direction from the unlocked position towards the locked position. Further, the main extension direction 50 of said guide slot part 55 has an extension direction component 54 in parallel with the linear movement direction 51 of the pushrod 31 in a direction towards the locked position when the guide pin 23 moves in the first direction.

In addition to the inclined part 55 of the guide slot 22, at an end 56 of the guide slot 22, the guide slot 22 can have a different extension direction 57, preferably an extension direction 57 substantially in parallel with the movement direction 51 of the pushrod 31.

Hereby, the position of the guide pin 23 at the end position (corresponding to the locked position of the pawl) can be more stable preventing accidental movement of the guide pin 23 and the pawl 18 from the locked position. Optionally, both ends 56, 58 of the guide slot 22 can have such parts with a main extension direction substantially in parallel with the movement direction of the pushrod. Thus, the guide slot 22 can be Z-shaped for instance.

It is to be understood that the present invention is not limited to the embodiments described above and illustrated in the drawings; rather, the skilled person will recognize that many changes and modifications may be made within the scope of the appended claims.

What is claimed is:

1. A parking lock device for a transmission of a vehicle, the device comprising:
   a wheel;
   a pawl for locking the wheel against rotation; and
   an actuator unit having a pushrod arranged for linear movement to move the pawl relative to the wheel, the pawl having a locked position where the pawl and the wheel are engaged and an unlocked position where the pawl and the wheel are disengaged, wherein the pawl and the pushrod are mechanically coupled to each other by a pin and slot mechanism having a guide slot and a guide pin received by the guide slot,
   wherein the actuator unit is arranged to move the pawl from the unlocked position to the locked position by movement of the guide pin along the guide slot in a first direction, and from the locked position to the unlocked position by movement of the guide pin along the guide slot in a second direction, and
   wherein for at least a part of the guide slot, a main extension direction of the guide slot is angled relative to the linear movement direction of the pushrod, the main extension direction of said guide slot part having an extension direction component perpendicular to the linear movement direction of the pushrod in a direction away from the wheel when the guide pin moves in the first direction.

2. The parking lock device according to claim 1, wherein the guide pin is attached to the actuator unit and the guide slot is arranged in the pawl.

3. The parking lock device according to claim 1, wherein the actuator unit comprises a hydraulic cylinder for movement of the pushrod.

4. The parking lock device according to claim 1, wherein the actuator unit has a support portion arranged to guide the pushrod for counteracting deviation from the linear movement of the pushrod.

5. The parking lock device according to claim 1, wherein the actuator unit comprises a spring arranged to counteract movement of the pawl from the locked position towards the unlocked position.

6. The parking lock device according to claim 5, wherein the spring is arranged on the pushrod.

7. The parking lock device according to claim 1, wherein the pawl is pivotally arranged for pivoting about a pivot axis between the locked position and the unlocked position.

8. The parking lock device according to claim 7, wherein the main extension direction of the guide slot is perpendicular to the pivot axis of the pawl.

9. The parking lock device according to claim 7, wherein in the unlocked position of the pawl, the wheel is pivotable about a pivot axis which wheel pivot axis is substantially in parallel with the pivot axis of the pawl.

10. The parking lock device according to claim 7, wherein the pawl has a body with a first end pivotally arranged for pivoting about the pivot axis and a second end mechanically coupled to the actuator unit by the pin and slot mechanism, the body being provided with a tooth for engagement with the wheel which tooth is arranged between the first end and the second end of the pawl body.

11. A transmission comprising the parking lock device according to claim 1.

12. The parking lock device according to claim 1, wherein the guide slot further comprises a first end and a second end being substantially parallel to the linear movement direction of the pushrod.

* * * * *